R. B. WHITE.
Saw Set.
No. 9,588.
Patented Feb. 15, 1853.
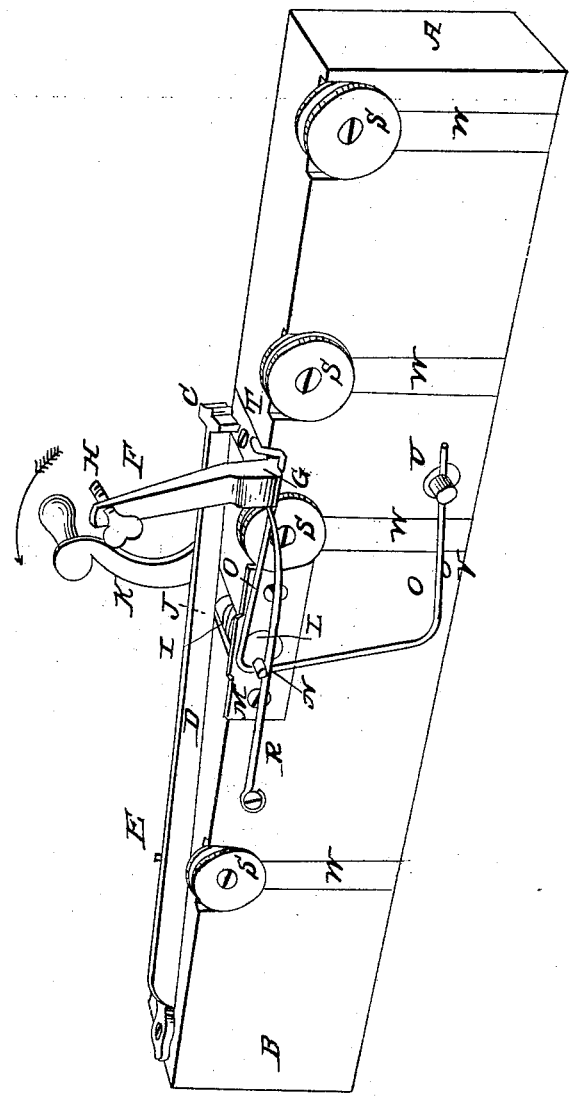

UNITED STATES PATENT OFFICE.

RAND B. WHITE, OF MENDON, NEW YORK.

SAW-SETTING MACHINE.

Specification of Letters Patent No. 9,588, dated February 15, 1853.

*To all whom it may concern:*

Be it known that I, RAND B. WHITE, of Mendon, in the county of Monroe, State of New York, have invented a new and Improved Machine for Setting Saws; and I do hereby declare that the following is a full and exact description thereof, reference being had to the accompanying drawing and to the letters of reference marked thereon.

The nature of my invention consists in constructing a machine by which I set the teeth of a saw to any required angle and more even than the ordinary way, by means of a spring hammer, or the handle of the hammer being made of a spring, so that the blow of the hammer is regulated by the spring and strikes each tooth with equal force, and also in attaching a tooth gage or spring which takes hold of every other tooth and draws the saw back into the required position to receive a blow from the hammer, the tooth gage being operated by the same shaft by which the hammer is drawn back. The teeth of the saw are always brought into the required position so as to receive the blow of the hammer, so that the teeth are all set even and alike, more perfect and with greater facility than by the saw sets now in use.

To enable others skilled in the art to make and use my invention I will proceed to describe its construction and operation by referring to the annexed drawing, which is a perspective view of my machine when ready for use.

A and B show the body of my machine. A shows the front end and B the back part.

C shows the hammer drawn back into a position to strike the tooth of a saw.

D shows the hammer handle or spring, which is attached to the hammer C at one end and to the body of the machine at the other end.

E shows a pin which is driven into the body of the machine directly back of the spring D and which may be moved so as to give any required force to the spring.

F and G show an upright which is firmly fixed to the body of the machine. The lower part of the upright at G is faced on the side next to the hammer so as to form an anvil or surface against which the saw teeth are brought so as to receive a blow from the hammer.

H is a regulating screw for the purpose of regulating the angle of the saw teeth when the saw is set.

I shows a shaft with a spiral groove cut into it, the groove making about one revolution around the shaft. One side of the shaft is cut away so as to take off the groove.

J shows a nib on the under side of the spring D, which works in the spiral groove which is cut around the shaft I, and by means of which the hammer C is drawn back.

K shows a crank which is firmly fixed to one end of the shaft I.

L shows the end of the shaft I opposite the end to which the crank is attached.

M shows a plate which is screwed to the side of my machine and which forms a box in which one end of the shaft I works. The opposite end works in a plate which is fixed in the same manner.

N shows a pin which is firmly fixed into the end L of the shaft I. The pin N is placed off of the center of the shaft, so as to operate as an eccentric or wrist of a crank.

O P and Q show the tooth gage. That part of the tooth gage marked P operates as a spring against the pin N.

R shows a rod or bar which is attached to the body of the machine at one end and rests on that part of the tooth gage shown O at the other end.

S S S S show wheels which are grooved so as to receive the edge or teeth of the saw. I place the teeth of the saw to be set on two or more of the wheels marked S, and on which the saw moves back, the teeth resting against the lower part of the upright at G, between the hammer C and the upright, the back of the saw resting against the point of the regulating screw H.

T shows the point of the tooth gage which takes hold of every other tooth and moves the saw back.

U shows the end of a bolt which holds the lower part of the tooth gage marked Q in its required position. The bolt U is tightened or loosened by a thumb screw on the opposite side of the machine.

V shows a pin which is also for the purpose of keeping the lower part of the tooth gage in its proper place.

The parts marked W are pieces dovetailed into the side of the machine for the purpose of raising and lowering the wheels marked S. The wheels S are fastened to the parts marked W by means of screws on which they work.

Now it will be seen that by placing the teeth of a saw onto the wheels S, as has been described, and turning the crank K in the direction shown by the arrow the nib J passes out of the spiral groove in the shaft I, and the hammer gives a blow to the saw tooth. As the crank is turned around the pin N, working on the rod R, presses down the upper part of the tooth gage O, and carries down the point of the tooth gage T. That part of the tooth gage marked P acts as a spring against the pin N, and follows the pin forward, so that the point of the tooth gage T is carried forward and springs up, so as to take hold of another tooth, and as the motion is kept up the saw is drawn back into the position so as to receive a blow from the hammer C on the tooth, as has been described, so that at each revolution of the crank K, a tooth of the saw is set.

In order to regulate my machine so as to set a fine or coarse saw I move the lower part of the tooth gage backward or forward in the bolt U. In order to set a fine saw I move the lower part of the tooth gage back so that the spring of the tooth gage does not follow the pin N in its whole revolution, so that the motion of the point of the tooth gage is shortened, and it may be placed in any position to set a fine or coarse saw.

Having thus described the construction and operation of my machine for setting saws, what I claim as my invention and desire to secure by Letters Patent is—

The combination of the spring hammer shown C and D, with the tooth gage shown O P and Q, both operating in the manner and for the purpose herein described and set forth.

RAND B. WHITE.

Witnesses:
ABRAM ALLEN,
H. R. SEARLS.